(12) United States Patent
Koetje et al.

(10) Patent No.: US 9,624,043 B2
(45) Date of Patent: Apr. 18, 2017

(54) HIGH RATE BULK FLOW SORTATION

(71) Applicant: Dematic Corp., Grand Rapids, MI (US)

(72) Inventors: Robert L. Koetje, Jenison, MI (US); Christopher W. Steiner, Grand Rapids, MI (US); Thomas H. Green, III, Wyoming, MI (US); Dennis J. Schuitema, Ada, MI (US); James A. Brumels, Allendale, MI (US); Thomas H. Triesenberg, Rockford, MI (US); John M. Karas, Grand Rapids, MI (US); Matthew T. Brayman, Ada, MI (US)

(73) Assignee: Dematic Corp., Grand Rapids, MI (US)

( * ) Notice: Subject to any disclaimer, the term of this patent is extended or adjusted under 35 U.S.C. 154(b) by 7 days.

(21) Appl. No.: 14/792,663

(22) Filed: Jul. 7, 2015

(65) Prior Publication Data

US 2016/0016738 A1    Jan. 21, 2016

Related U.S. Application Data

(60) Provisional application No. 62/025,303, filed on Jul. 16, 2014, provisional application No. 62/049,803, filed on Sep. 12, 2014.

(51) Int. Cl.
    *B65G 47/30*    (2006.01)
    *B65G 47/26*    (2006.01)
    (Continued)

(52) U.S. Cl.
    CPC ............. *B65G 47/681* (2013.01); *B07C 1/02* (2013.01); *B65G 47/28* (2013.01); *B65G 47/844* (2013.01)

(58) Field of Classification Search
    CPC ....... B65G 47/30; B65G 47/26; B65G 47/261
    (Continued)

(56) References Cited

U.S. PATENT DOCUMENTS 2,753,975 A * 7/1956 Day ..................... B65B 35/54
                                                198/448
3,610,396 A * 10/1971 Babunovic ........... B65G 47/682
                                                198/454
(Continued)

FOREIGN PATENT DOCUMENTS

DE        102010062830 A1    6/2012

OTHER PUBLICATIONS

International Search Report (Form PCT/ISA/210) and Written Opinion of the International Searching Authority (Form PCT/ISA/237) from corresponding Patent Cooperation Treaty Application No. PCT/US2015/039294, mailed Oct. 7, 2015.

*Primary Examiner* — Douglas Hess
(74) *Attorney, Agent, or Firm* — Gardner, Linn, Burkhart & Flory, LLP (57) ABSTRACT

A mixed article sortation system and method of sorting the bulk flow of mixed articles being of various sizes and shapes to separate destinations includes at least two bulk flow singulators, each configured to receive a bulk flow of mixed articles and arrange the articles to respective first and second single-file flows. A first article induct arranges the first flow of articles from one of the singulators to a first flow of gapped articles and a first article sensor senses the identity and weight of each article. A second article induct arranges the single-file flow of articles from the other singulator to a second flow of gapped articles and a second article sensor senses the identity and weight of each article in said second single-file flow. A combiner combines the first and second single-file flow of articles into a third single-file flow of
(Continued)

articles. A sorter receives the third single-file flow of mixed articles and sorts the articles to separate destinations.

27 Claims, 8 Drawing Sheets

(51) Int. Cl.
*B65G 47/68* (2006.01)
*B07C 1/02* (2006.01)
*B65G 47/28* (2006.01)
*B65G 47/84* (2006.01)

(58) Field of Classification Search
USPC .................................. 198/444, 448, 460.1
See application file for complete search history.

(56) References Cited

U.S. PATENT DOCUMENTS

| | | | |
|---|---|---|---|
| 3,774,747 A * | 11/1973 | Hetchler | B65G 47/682 198/398 |
| 3,828,914 A * | 8/1974 | Tull | B65G 47/28 198/610 |
| 4,044,897 A | 8/1977 | Maxted | |
| 5,038,911 A * | 8/1991 | Doane | B65G 43/08 198/357 |
| 5,267,638 A * | 12/1993 | Doane | B65G 43/08 198/357 |
| 5,701,989 A | 12/1997 | Boone et al. | |
| 5,738,202 A | 4/1998 | Ydoate et al. | |
| 5,761,883 A * | 6/1998 | Pruett | B65B 23/16 53/246 |
| 5,769,204 A | 6/1998 | Okada et al. | |
| 5,782,332 A * | 7/1998 | Guidetti | B65G 47/70 198/357 |
| 5,950,800 A | 9/1999 | Terrell et al. | |
| 6,131,723 A | 10/2000 | Schroader et al. | |
| 6,189,702 B1 * | 2/2001 | Bonnet | B65G 47/82 198/370.02 |
| 6,253,905 B1 | 7/2001 | Pelka | |
| 6,435,331 B1 * | 8/2002 | Olson | B65G 43/08 198/357 |
| 6,481,579 B2 * | 11/2002 | Kennedy | B07C 5/3422 198/448 |
| 6,484,886 B1 | 11/2002 | Isaacs et al. | |
| 6,513,641 B1 * | 2/2003 | Affaticati | B07C 5/36 198/357 |
| 6,860,383 B2 | 3/2005 | Veit et al. | |
| 7,086,519 B2 | 8/2006 | Veit et al. | |
| 7,168,552 B2 | 1/2007 | Katayama | |
| 7,513,356 B2 | 4/2009 | Veit et al. | |
| 7,837,022 B2 * | 11/2010 | Schoenke | B65G 21/2018 198/398 |
| 8,061,506 B2 * | 11/2011 | Schafer | B65G 43/08 198/444 |
| 8,322,512 B2 * | 12/2012 | Balk | B65G 37/02 198/347.4 |
| 8,408,380 B2 | 4/2013 | Doane | |
| 8,820,520 B2 | 9/2014 | Triesenberg et al. | |
| 2007/0246328 A1 | 10/2007 | Reznik | |
| 2015/0001138 A1 | 1/2015 | Brunsen | |

* cited by examiner

HIGH RATE BULK FLOW SORTATION

CROSS REFERENCE TO RELATED APPLICATION

This application claims priority from U.S. patent application Ser. No. 62/025,303, filed on Jul. 16, 2014, and U.S. patent application Ser. No. 62/049,803, filed on Sep. 12, 2014, the disclosures of which are hereby incorporated herein by reference.

BACKGROUND OF THE INVENTION

The present invention is directed to a method and apparatus for organizing a bulk flow of mixed articles. Such mixed articles being of various sizes and shapes into separate destinations. While the invention is illustrated for use with parcel or postal carton handling, it may find applications in the handling of other article types.

Articles shipped in the parcel and postal segment are usually transported in bulk and often in consumer packed articles with barcode printed labels on each article. The articles are of a variety of sizes and weights, and the label can be applied to any surface of the article. In order to direct each article to its destination, the articles are unloaded in bulk from the transport vehicle in a sorting facility. Each article must be scanned so that the article can be properly directed to its destination and weighed so that the transport vehicles are not overloaded and the customer properly charged a fee. The articles must be sorted into destinations which may be a plane or truck destined for a particular city or a local delivery van.

While any capacity can theoretically be achieved by merely multiplying equipment, there is a cost of doing so not only in additional capital outlay, but also in the size of the building that must be built to accommodate the equipment footprint.

SUMMARY OF THE INVENTION

The present invention accomplishes the organization of a bulk flow of articles into separate destinations as quickly as possible with as small of equipment footprint as feasible. The present invention provides a method and system for organizing a bulk flow of articles into separate destinations at a rate and small size that has previously not been possible.

A mixed article sortation system and method of sorting the bulk flow of mixed articles to separate destinations, the mixed articles being of various sizes and shapes, according to an aspect of the invention, includes at least two bulk flow singulators, each configured to receive a bulk flow of mixed articles being of various sizes and shapes and arrange the bulk flow of articles to respective first and second single file flows of mixed articles. A first article induct arranges the first single file flow of mixed articles from one of the singulators to a first flow of gapped mixed articles separated by gaps and a first article sensor receives the first single file flow of gapped mixed articles and senses at least the identity and weight of each article in the first single file flow of gapped mixed articles. A second article induct arranges the single file flow of mixed articles from the other of said singulators to a second flow of gapped mixed articles separated by gaps and a second article sensor receives the second single file flow of gapped articles and senses at least the identity and weight of each article in said second single file flow of gapped articles. A combiner combines the first and second single file flow of gapped mixed articles from the first and second article sensors into a third single file flow of mixed articles. A positive displacement sorter receives the third single file flow of mixed articles from the combiner and sorts the articles to separate destinations.

The articles of the first and second flows of gapped articles may arrive at the combiner in a controlled relative position manner wherein the articles are combined into the third single file flow of articles by lateral displacement of some of the articles. Each of the singulators may be recirculating singulators, each having a bulk flow input that is configured to receive a bulk flow of articles, a singulating conveying surface extending from the input to an output that is configured to arrange side-by-side articles into a single file flow of articles and a recirculate conveying surface that is configured to return at least one of side-by side articles from the singulating conveying surface at the output to the singulating conveying surface at the input. The bulk flow singulators may share a common recirculate conveying surface or each may have a separate recirculate conveying surface.

A third article induct may be provided between the combiner and the sorter to adjust gaps between articles in the third single file flow of mixed articles. A fourth article induct between the first article sensor and combiner may be provided to adjust gaps between articles exiting the first article sensor. A fifth article induct may be provided between the second article sensor and combiner to adjust gaps between articles exiting the second article sensor.

A first dynamic accumulator may be provided between the first bulk flow singulator and first induct to remove gaps in the first single file flow of mixed articles. A second dynamic accumulator may be provided between the second bulk flow singulator and second induct to remove gaps in the second single file flow of mixed articles.

A control may be provided that is responsive to the article sensors to track identity of articles downstream of the article sensors wherein identity of each article supplied to the sorter is known independent of further sensing of the articles in the third single file flow of mixed articles. The sorter may be capable of sorting at least 10,000 articles per hour.

The combiner may include a conveying surface defined by the upper surfaces of upper slats that are interconnected in a longitudinally travelling web and pusher shoes that each travel along at least one of the slats to laterally displace articles on the conveying surface from the second single file flow of gapped mixed articles to the first single file flow of gapped mixed articles to create the third flow of mixed articles. The combiner may edge-align articles supplied in the third single file flow of mixed articles.

The combiner may include a first conveyor receiving articles from the first single file flow of gapped mixed articles and a second conveyor that is generally parallel with and adjacent the first conveyor. The second conveyor receives articles from said second single file flow of gapped mixed articles. A control monitors the first and second single file flows of gapped mixed articles to establish relative position between articles in the first and second single file flows of gapped mixed articles and diverts an article from the second conveyor to laterally displace that article onto the first conveyor into a space between articles on the first conveyor. In this manner, articles exit the first conveyor in a merged stream of articles as the third single file flow of mixed articles.

The second conveyor may be made up of a plurality of parallel slats that are interconnected in a web that travels in a longitudinal direction and a plurality of pusher shoes, each traveling laterally along at least one of the slats. The control diverts pusher shoes adjacent the article being diverted toward the first conveyor from a non-diverting state in which the pusher shoes do not travel laterally to a diverting state in which the pusher shoes travel laterally. The first single file flow may supply articles that are edge-aligned articles on the first conveyor in alignment with the extent of pusher shoe travel when in the diverting state wherein diverted articles are edge-aligned with the articles of the first single file flow of gapped mixed articles when the articles exit the first conveyor as the third single file flow of articles.

The control may control relative speeds of at least the first and second inducts in order to establish controlled relative positions between articles on the first and second conveyors. Diverted ones of the pusher shoes may travel together in a longitudinal line to laterally displace an article without substantial rotation of that article.

The pusher shoes may have extensions that at least partially overlay the first conveyor when diverted in order to ensure that an article is displaced fully onto the first conveyor. A return rail may be provided that laterally returns the pusher shoes to a position where the extensions are not overlaying the first conveyor before the pusher shoes travel to an end of said web.

A mixed article combiner and method of combing first and second single file flow of gapped mixed articles into a third single file flow of mixed articles, the mixed articles having different sizes and shapes, according to an aspect of the invention, includes a first conveyor receiving the first single file flow of gapped mixed articles. A second conveyor is generally parallel with and adjacent the first conveyor. The second conveyor receives the second single file flow of gapped mixed articles. A control monitors articles to establish relative positions between articles of the first and second single file flows of gapped mixed articles and diverts articles from the second conveyor to laterally displace the articles to the first conveyor into a space between articles on the first conveyor. In this manner, mixed articles exit the first conveyor in a merged stream of edge-aligned articles as the third single file flow.

These and other objects, advantages and features of this invention will become apparent upon review of the following specification in conjunction with the drawings.

DESCRIPTION OF THE PREFERRED EMBODIMENT

Figure 1:
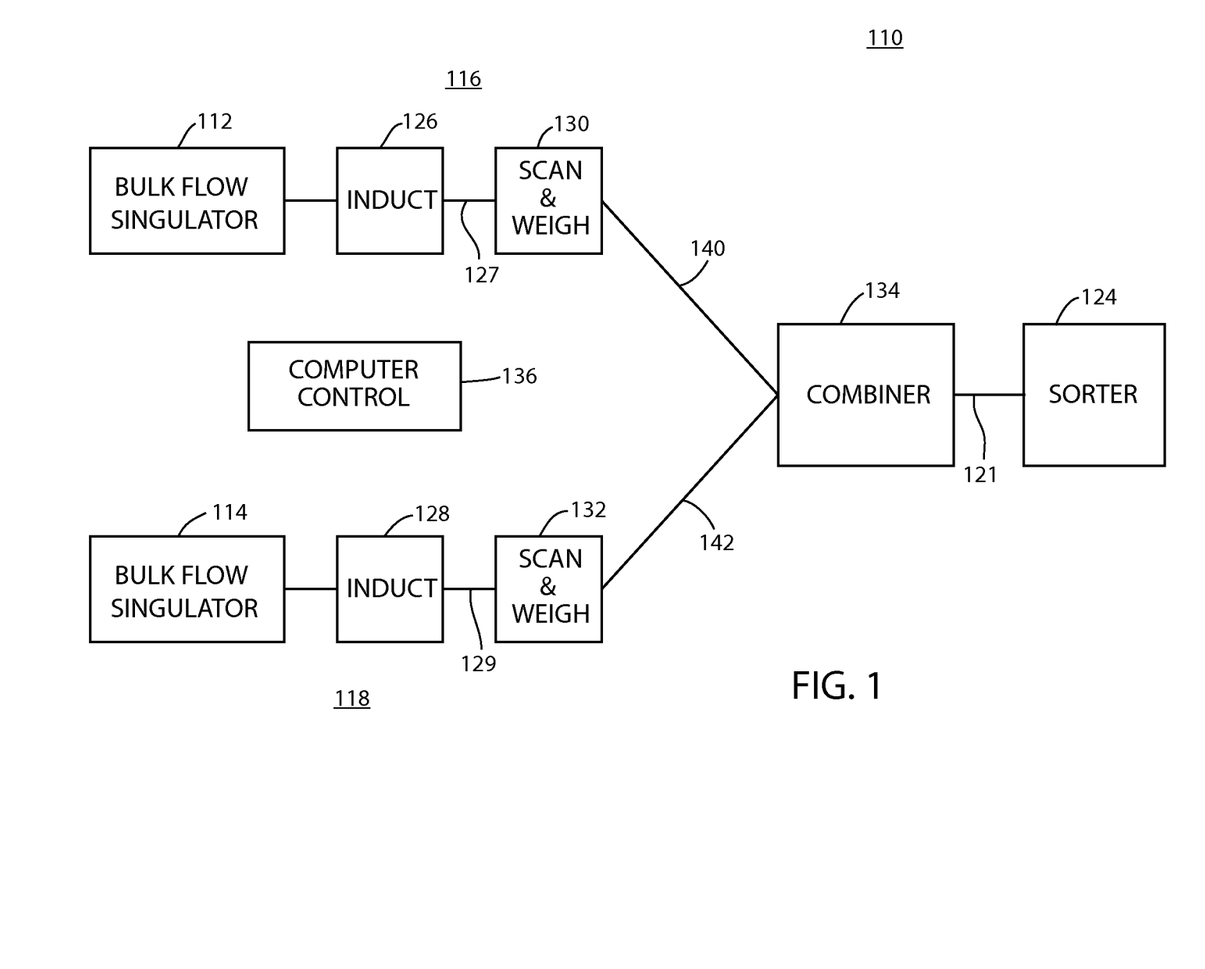
FIG. 1 is a block diagram of a high rate bulk flow sortation system, according to an embodiment of the invention.
Figure 4:
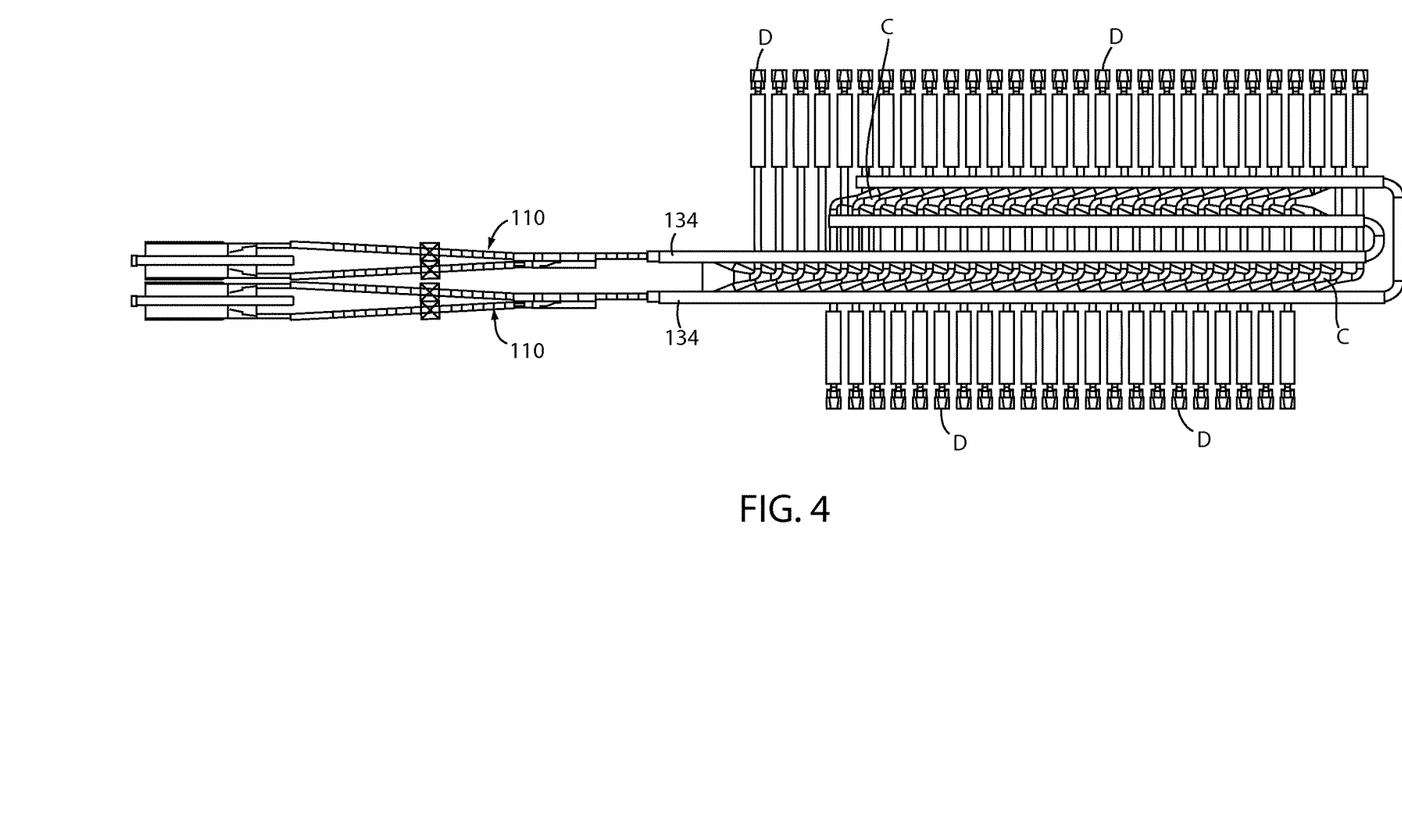
FIG. 4 is a top plan view of a warehouse material-handling system including multiple sortation systems.

Referring now to the drawings and the illustrative embodiments depicted therein, a mixed article routing system 110 is adapted to organize a bulk flow of mixed articles, which are illustrated as cartons, but could be totes, trays, receptacles, and unpacked items into separate destinations (FIG. 1). Mixed articles are articles of a variety of different shapes and sizes. It should be understood that system 110 may be duplicated in order to increase the throughput of the system as illustrated in FIG. 4. In the illustrated embodiment, system 110 is capable of routing 10,000, or potentially 15,000, 20-inch maximum sized articles per hour. Therefore, between 20,000 and 30,000 articles per hour can be achieved by duplicating system 110, as seen in FIG. 4.

System 110 receives mixed articles in bulk, such as unloaded from transport vehicles (not shown). The articles are of various sizes and shape and are of various orientations with an indicator, such as a barcode or QE code facing in any direction. The bulk flow of articles is supplied to two bulk flow singulators, namely, a first bulk flow singulator 112 and a second bulk flow singulator 114. Bulk flow singulator 112 is configured to receive a bulk flow of mixed articles being of various sizes and shapes and to arrange the bulk flow of articles to a first single-file flow of articles which are converted to a first single file flow of gapped articles by an induct 126. Bulk flow singulator 114 is configured to receive a bulk flow of articles of various sizes and shapes and to arrange the bulk flow of articles to a second single-file flow of articles which are converted to a second single file flow of gapped articles by a second induct 128.

The output 127 of induct 127 supplies the first single file flow of gapped articles to an article sensor 130 where the barcode label on the article is scanned regardless of the surface of the article on which the label is located. This is accomplished by scanners directed to the top, bottom and all four (4) sides of the article. Article sensor 130 includes a scale that measures the weight of the article. Article sensor 130 is commercially available from multiple different sources. The identity of the article and its weight are stored in a computer system 136, which may be a programmable logic controller, microcomputer, or other form of industrial computer. In a similar fashion, the second single-file flow of articles provided from output 129 of induct 128 is supplied to a carton sensor 132 where the barcode label on the article is scanned regardless of the surface of the article on which the label is located. Also, the articles are weighed and the identity and weight of each article is stored with computer system 136.

Downstream the article sensors 130, 132, the articles will already be controlled for relative positions on both lines 140, 142 when they arrive at a combiner 134 so it will be possible to combine first and second single-file flow of gapped articles without further adjustment of the gaps. However, if desired, an additional induction unit may be provided in lines 140, 142 between article sensor 130 and combiner 134 in order to adjust article gaps and relative positions of articles at the first single-line flow of gapped articles relative to articles at the second single line for proper combination with the second single-line flow of gapped articles. Likewise, an additional induction unit may be provided between article sensor 132 and combiner 134 in order to adjust article gaps at the second single-line flow of gapped articles and relative position to articles in the first single line from gapped articles. Thus, inducts 126 and 128 are coordinated so that downstream of article sensors 130, 132, the first and second flows of gapped articles arrive at combiner 134 in a staggered manner in order to be combined into the third single-file flow of articles 121, such as by lateral displacement of the articles. Combiner 134 combines the first and second single-line flows of gapped articles to a third single-line flow of articles at 121 which are supplied to a sorter 124 for sortation. In the illustrated embodiment, a minimum gap of 6 inches between articles supplied to sorter 124 will allow the sorter to sort the articles to their respective destinations. Because computer system 136 tracks the identity of each article, it is capable of instructing sorter 124 of the destination for each article. An option article identifier, such as a barcode scanner or RFID reader (not shown), may be deployed ahead of sorter 124 to confirm the identity of each article. In this manner, each article supplied to sorter 124 will be identified either by the optional article identifier or as tracked by the computer system 136 or a combination of both.

While combiner 134 can be of various known forms, such as converging vertical surfaces or rotating guide belts, in the illustrated embodiment, combiner 134 includes a conveying surface defined by the upper surfaces of upper slats that are interconnected in a longitudinally travelling web and pusher shoes that each travel along at least one of the slats to laterally displace articles on said conveying surface. Combiner 134 is capable of edge-aligning articles supplied in the third single-file flow 121. While this may be accomplished with multiple pusher shoes on at least some of the slats in the illustrated embodiment, only one pusher shoe is provided on each slat.

Figure 2:
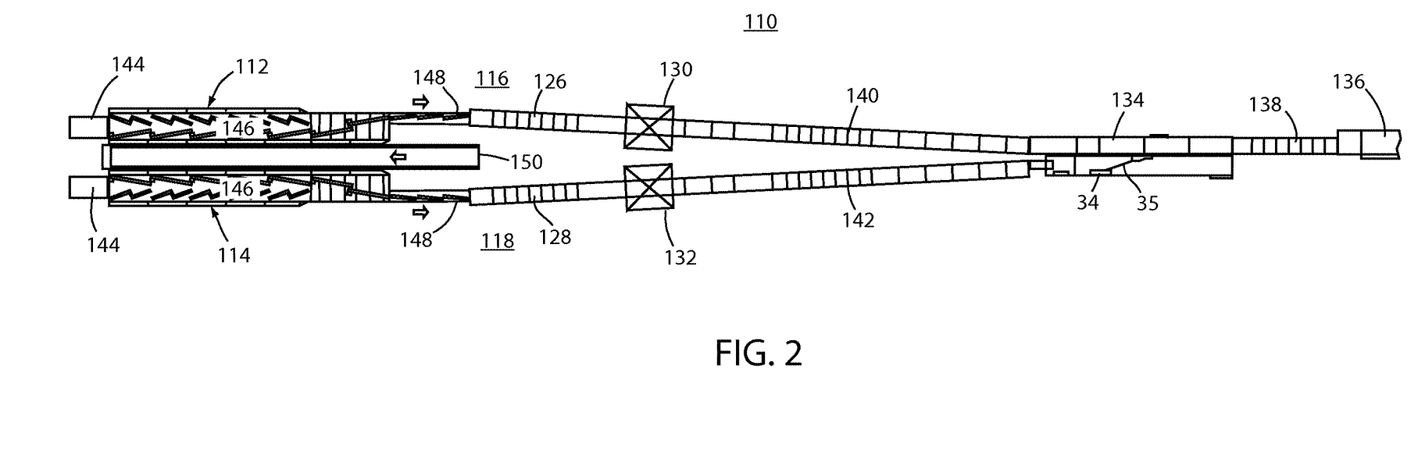
FIG. 2 is a top plan view of the physical layout of the component of the sortation system in claim 1.

Singulators 112, 114 may be any of the various types of devices known in the art. In the embodiment illustrated in more detail in FIGS. 2 and 3, the singulators are recirculating singulators marketed by Cinetics having a bulk flow singulation capacity of up to 7,500 articles per hour. Each singulator has a bulk flow input 144 that is configured to receive a bulk flow of articles and a singulating conveying surface 146 extending from input 144 to an output 148 that is configured to arrange side-by-side articles into a single-file flow of articles. Singulators 112, 114 include a recirculate conveying surface 150 that is configured to return at least one of side-by side articles from singulating conveying surface 146 at output 148 to the singulating conveying surface at input 144. Only the drives of the rollers making up conveying surface 146 are shown for clarity. In the illustrated embodiment, bulk flow singulators 112, 114 share a common recirculate conveying surface 150. However, bulk flow singulators 112, 114 may each have a separate recirculate conveying surface 150 thereby increasing recirculating flow capacity for system 110.

Article routing system 110 may further include a third article induct 138 between combiner 134 and sorter 136. Third article induct 138 is configured to adjust gaps between articles in the third single-file flow of articles, if needed. System 110 may further include a fourth article induct in line 140 between first article sensor 130 and combiner 134 to adjust gaps between articles exiting the first article sensor and a fifth article induct 142 in line between the second article sensor 132 and combiner 134 to adjust gaps between articles exiting the second article sensor. The fourth and fifth article inducts are controlled to adjust relative positions in articles between lines 140 and 142 as previously described. Although various configurations may be used, all inducts referred to above may be of the type disclosed in commonly assigned U.S. Pat. No. 8,408,380 for a CONVEYOR INDUCT, the disclosure of which is hereby incorporated herein by reference. Sorter 136 is a high capacity positive displacement sorter that is capable of sorting at least 10,000 mixed articles per hour. Such sorter may be a high speed parallel divert sorter of the type disclosed in commonly assigned U.S. Pat. Nos. 5,927,465; 6,041,909; 6,513,642; 6,814,216; 6,860,383; 6,866,136; 6,923,308; 7,086,519; 7,117,988; 7,128,197; 7,513,356 and 8,469,177, the disclosures of which are hereby collectively incorporated herein by reference. However, any sorter capable of sorting at this rate may be used Thus, it can be seen that with bulk flow singulators each capable of singulating up to 7,500 articles per hour and sorter 136 capable of sorting at least 10,000 articles per hour, system 110 is capable of sorting at least 10,000 to 15,000 articles per hour to destinations according to the identities of the articles. Sorter 136 is capable of sorting articles to a large number of separate destinations D, which are illustrated in FIG. 4 as trucks at loading docks. Conventional chutes and conveyors are used to route articles form each conveyor 136 to the appropriate destination D.

Figure 3:
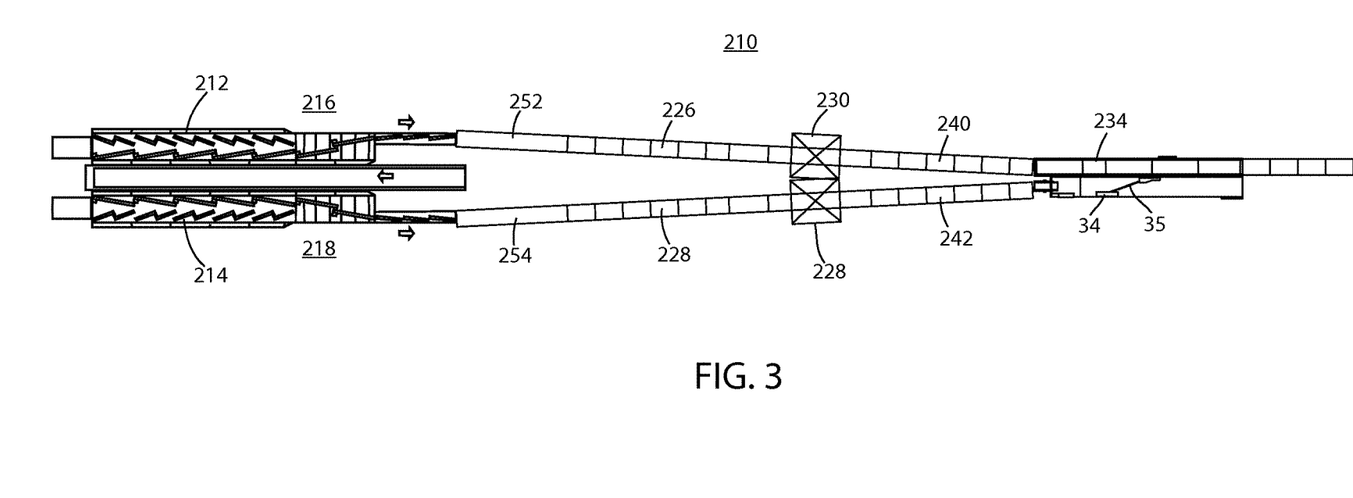
FIG. 3 is a detailed view of the components of an alternative embodiment of a high rate bulk flow sortation system.

A mixed article routing system 210 is generally the same as system 110 except that it includes a first dynamic accumulator 252 in a first single-file flow of articles 216 to remove gaps between articles downstream of a first bulk flow singulator 212. A second dynamic accumulator 254 is in a second single-file flow of articles 218 to remove gaps between articles downstream of a second bulk flow singulator 214. Dynamic accumulators 252 and 254, which are well known in the material-handling industry, are low-pressure pneumatic actuated belt driven live roller conveyors, which provide slight pressure engagement between the articles and do not include photo sensors or other article sensors to sense articles. Inducts in lines 226 and 228 are the same inducts 126, 128. Article sensors 230, 232 are the same as sensors 130, 132. Inducts in lines 240, 242 are the same as inducts in lines 140, 142. Combiner 234 is the same as combiner 134. A sorter (not shown) is the same as sorter 124.

Systems 110 and 210 include a control including computer system 136. Such control tracks identity of articles downstream of article sensors 130, 132, 230 and 232, wherein the identity of articles supplied to a respective sorter is known independent of further sensing of the articles in the third single-file flow of articles. This allows the respective sorter to sort the articles independent of, or in addition to, any article scanner at the entrance to the sorter.

Figure 5:
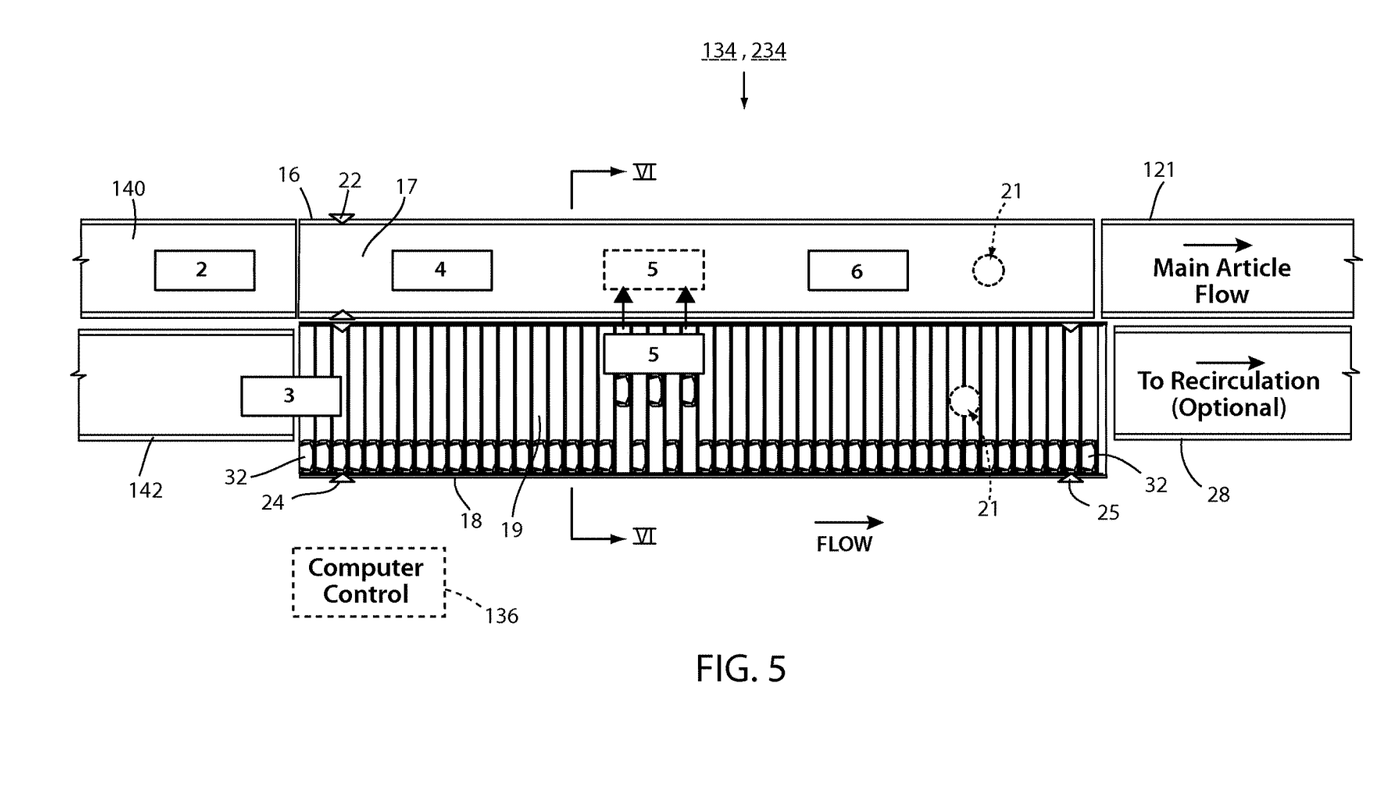
FIG. 5 is a top plan view of a combiner according to an embodiment of the invention.
Figure 6:
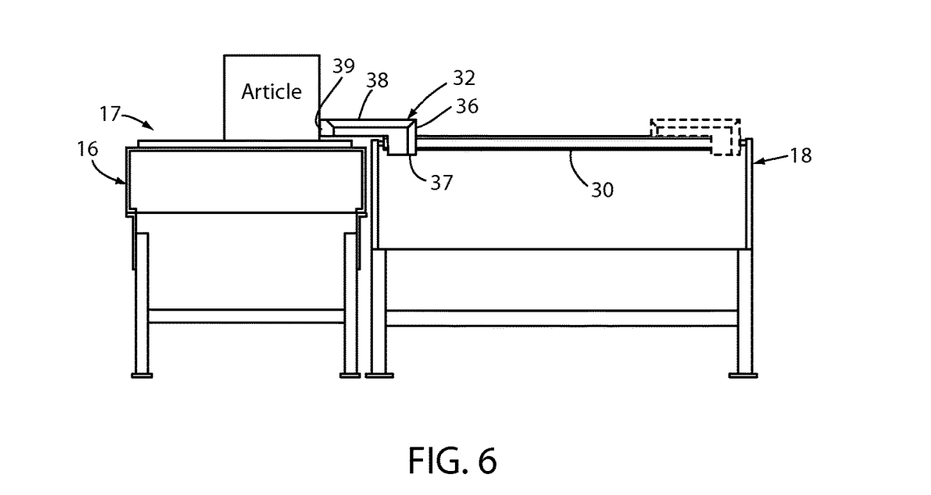
FIG. 6 is a sectional view taken along the line VI-VI in FIG. 5.
Figure 7:
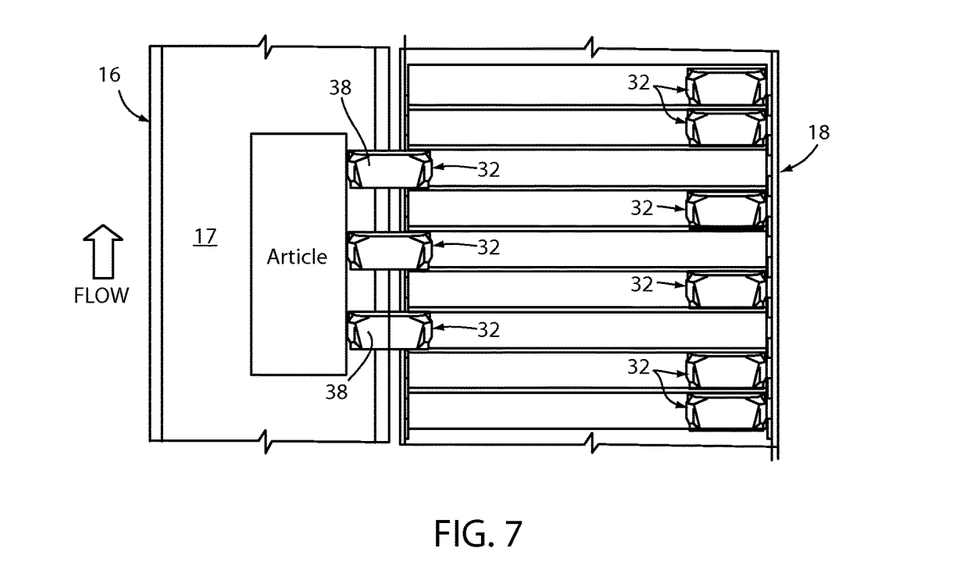
FIG. 7 is a top plan view of a portion of the combiner shown in FIG. 6.

A combiner, or merge assembly, 134, 234 merges multiple streams of mixed articles being of various sizes and shapes from a first feed 140 and a second feed 142 (FIG. 5). First feed 140 supplies a stream of mixed articles to a first conveyor 16, which, in the illustrated embodiment, is a belted conveyor having a conveying surface 17 that is a travelling conveyor belt 40. Second feed 142 supplies a stream of mixed articles to a second conveyor 18 that is generally parallel with and adjacent to first conveyor 16, as best seen in FIG. 5. Each conveyor 16, 18 has a separate conveying surface. While they may share certain structural components, they have separate frames. The conveying surfaces of conveyors 16, 18 are as close together as possible and may have a skid plate between them to avoid gaps that may catch an article being diverted. Second conveyor 18 is a diverting conveyor having a conveying surface 19 made up of a plurality of parallel slats 30 that are interconnected in a web that travels in a longitudinal direction. Second conveyor 18 has a plurality of pusher shoes 32, each traveling laterally along at least one of slats 30. Selected ones of pusher shoes 32 are diverted from a non-diverting state, in which the shoe does not travel laterally of conveying surface 19 and a diverting state in which the shoe travels laterally across conveying surface 19 by a diverter switch 34 which diverts the pusher shoe to a diverting rail 35 below conveying surface 19. Second conveyor 18 is similar in operation to a positive displacement sorter of the type disclosed in commonly assigned U.S. Pat. No. 6,814,216, the disclosure of which is hereby incorporated herein by reference. As noted above, in the illustrated embodiment, first conveyor 16 is a belt conveyor, of the type well known in the art although a variety of conveying surface materials and designs may be used.

Control 136 receives input from a first article sensor, such as a photo sensor 22, to monitor articles entering first conveyor 16 and from a second article sensor, such as a photo sensor 24, to monitor articles entering a second conveyor to ensure proper relative spacing for lateral combination of the articles. Control 136 controls relative positions of articles arriving from inducts 140 and 142 and controls inducts 140, 142 in a manner that provides controlled positioning between articles supplied to conveyors 16, 18 that will be sufficiently spaced to merge articles with controlled spaces between articles. While relative positions of articles may be controlled by control of inducts 140, 142, the relative positions may be controlled upstream, such as at inducts 126, 128. Indeed, inducts 140, 142 may be replaced with conveyors if relative positions of articles are controlled by inducts 126, 128. Inducts 126, 128, 138, 140 and 142 may be any type known in the art, such as those disclosed in commonly assigned U.S. Pat. Nos. 5,267,638; 6,918,484 and 8,408,380, the disclosures of which are hereby incorporated herein by reference in their entireties.

Control 136 monitors the location of articles on second conveyor 18 and is aware of the location of pusher shoes 32 using the technology disclosed in the '216 patent referred to above. Control 20, therefore, identifies which pusher shoes are adjacent an article on the second conveyor. The pusher shoes that are adjacent an article are diverted by some or all of diverter switches 34 in order to laterally push that article onto the first conveyor 16 into a space between articles on the first conveyor 16, as illustrated in phantom in FIG. 5. In this manner, a third stream of singulated stream of mixed articles from the merger of articles from the second flow of singulated mixed articles arriving on conveyor 18 with the articles from first flow of singulated mixed articles arriving on conveyor 16 exit the first conveyor 16 in a merged stream of singulated articles on an exit conveyor 121 extending from first conveyor 16. An optional recirculating conveyor 28 may extend from a discharge end of second conveyor 18 in order to return to a feed end of second conveyor 18 or to another area any articles that are unable to merge with articles on first conveyor 16 sensed by a sensor 25.

Figure 8:
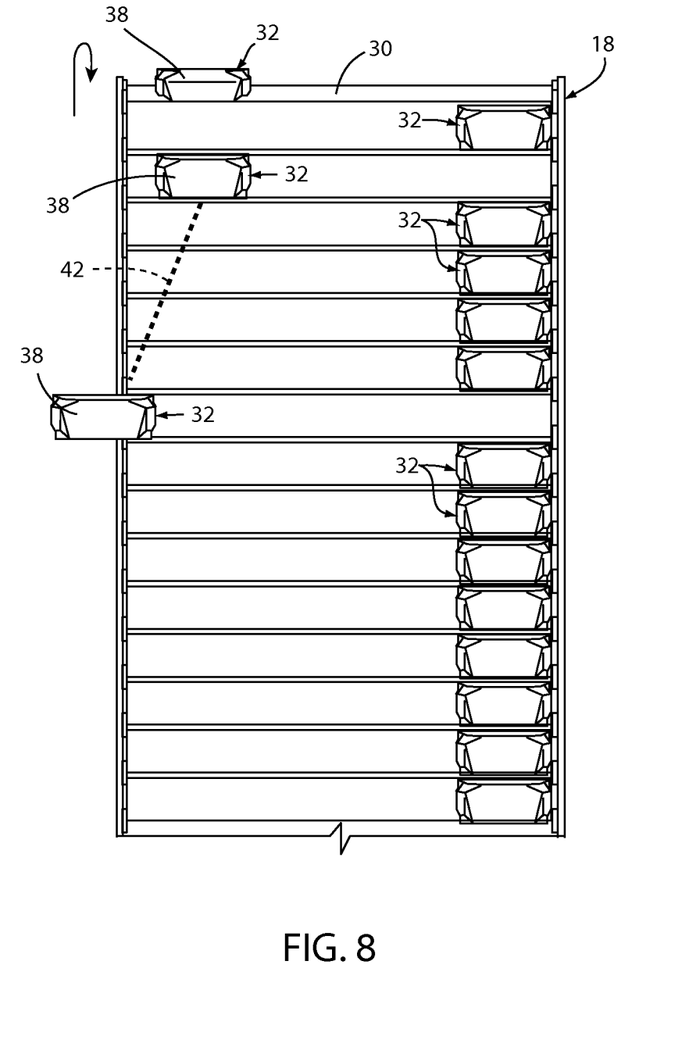
FIG. 8 is a top plan view of the second conveyor illustrating a diverter return rail.

Pusher shoes 32 travel in a longitudinal line, in the illustrated embodiment, to laterally push an article without substantial rotation of that article. This is known as parallel sortation. This may be accomplished by all of the diverter switches 34 that divert the pusher shoes to divert a particular article being actuated at approximately the same time. Each diverter switch 34 diverts a pusher shoe 32 onto a diverter rail 35 under conveying surface 19 thereby causing the lateral travel of the pusher shoe. Pusher shoes 32 each have a lower portion 37 that is below conveying surface 19 to engage the diverting rail and a cap 36 extending above the conveying surface to engage the article. The shoe cap 36 has an extension 38 that overlays a portion of the conveying surface 17 of first conveyor 16 when that pusher shoe is fully diverted in order to ensure that an article is pushed fully onto the conveying surface of first conveyor 16, as best seen in FIGS. 3 and 4. A return rail 42 is provided below conveying surface 19 that laterally returns diverted pusher shoes to a position where extensions 38 do not overlay first conveyor 16 before those pusher shoes 32 travel to an end of the web of second conveyor 18, as seen in FIG. 8. This avoids mechanical interference between the pusher shoe cap extensions 38 and the first conveyor when the pusher shoes drop down as they travel around the end of the second conveyor. Return rails 42 may partially return the diverted pusher shoes to a location that clears first conveyor 16 or may return them to the fully non-diverted position of pusher shoes at the charge end of second conveyor 18 adjacent second feed 14.

The first flow of singulated gapped mixed articles may arrive on conveyor 16 edge-aligned toward the portion of conveyor 16 that is closest to conveyor 18, as seen in FIG. 5. This may be accomplished using conventional edge-alignment techniques (not shown) that edge align the articles upstream of conveyor 16, such as on induct 140, 240 or upstream of such inducts. Because the articles are a mixture of various sizes and shapes, the articles can only be aligned along one edge thereof. Such edge-aligned articles on the first conveyor are aligned along an imaginary line that is reached by the diverting surface 39 at the farthest lateral extent that the extension 38 of pusher shoes travel in the diverting state. In this manner, articles that are diverted with pusher shoes 32 are edge-aligned with articles fed from first feed 12 and all articles are edge-aligned when they exit the first conveyor in a merged stream of articles on conveyor 26. This allows the merged mixed articles of a variety of shapes and sizes to be sorted by sorter 124, without further alignment. This allows the mixed articles to arrive at sorter 124 with minimum gapping achieved without rotation of the articles during merging or edge aligning of the merged articles.

Control 136 regulates the relative speeds of the conveyors 16, 18 in order to synchronize the speeds of the conveyors. This may be accomplished by pulse position monitors 21 that monitor movement, respectively, of conveyors 16 and 18. Control 136 also monitors articles at a feed end of the conveyors with photo sensors 22 and 24. Control 136 responds to sensors 22, 24 and possibly additional upstream sensors to control relative speeds of lines 140, 142 in order to establish controlled spaces between articles on conveyors 16, 18 using, for example, techniques disclosed in the '638 and '484 patents referred to above. As described above, control 136 monitors relative positions of articles and pusher shoes on the second conveyor in order to determine which pusher shoes are aligned with an article in order to determine which diverter switch 34 to actuate to divert an article. Although conveyors 16, 18 are illustrated as separate synchronized conveying surfaces, it would be comprehended that these could be incorporated into a single conveying surface.

Figure 9:
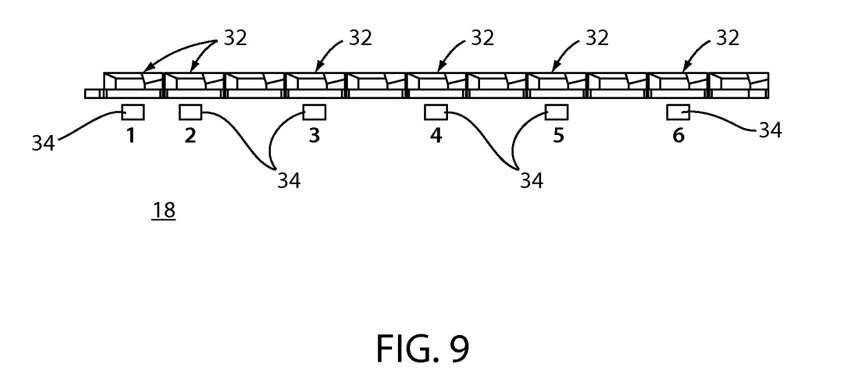
FIG. 9 is an enlarged side elevation view illustrating schematically a layout of a diverter switch assembly.
Figure 10:
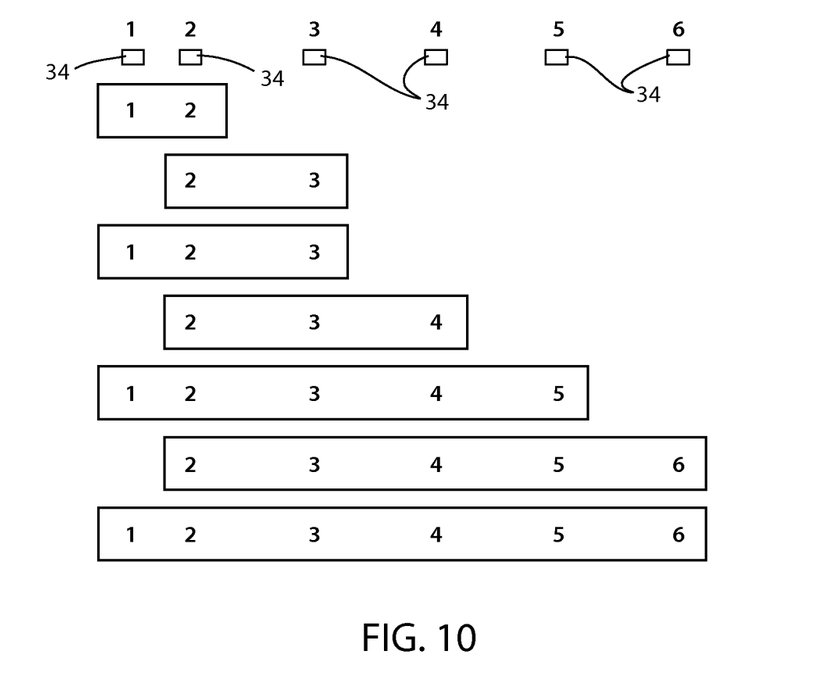
FIG. 10 is a diagram illustrating operation of the diverter switches in FIG. 9 to divert various lengths of articles.

The plurality of diverter switches 34 that are operable to actuate a pusher shoe 32 to travel across the second conveyor 18 are arranged as shown in FIGS. 9 and 10. The diverter switches 34 are spaced apart at intervals that are equal to integral values of the slat pitch because, in the illustrated embodiment, the pusher shoes travel along a slat and therefore are also spaced at integral values of the slat pitch. At least one pair of adjacent diverter switches, designated #1 and #2, are spaced apart one slat pitch. The remaining adjacent diverter switches #3 through #6 may be spaced apart two slat pitches, as seen in FIG. 9. This configuration allows a wide range of article lengths to be diverted without the need for as many diverter switches.

FIG. 10 illustrates the identity of diverter switches that are switched for various article lengths. It should be understood that not all diverter switches need to be operated for the length of the article, it being necessary to only actuate the diverter switches to divert the pusher shoes at the front portion and rear portion of the article with intermediate diverter switches not operated. It should also be understood that, although only one set of diverter switches #1 through #6 is shown to divert one article onto first conveyor 16, it is possible to have two or more sets of diverters to divert more than one article at a time and to divert articles at different longitudinal positions along conveying surface 19.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A mixed article sortation system that is adapted to organize a bulk flow of articles into separate destinations, the mixed articles being of various sizes and shapes, said system comprising:
   at least two bulk flow singulators each configured to receive a bulk flow of mixed articles being of various sizes and shapes and to arrange the bulk flow of articles to respective first and second single-file flows of articles;
   a first article induct that arranges the first single-file flow of mixed articles from said one of said singulators to a first flow of gapped articles separated by gaps and a first article sensor that receives the first single-file flow of gapped mixed articles and senses at least the identity and weight of each article in the first single-file flow of gapped mixed articles;
   a second article induct that arranges the single-file flow of mixed articles from the other of said singulators to a second flow of gapped mixed articles separated by gaps and a second article sensor that receives the second single-file flow of gapped mixed articles and senses at least the identity and weight of each article in the second single-file flow of gapped mixed articles;
   a combiner that combines the first and second single-file flow of gapped articles from the first and second article sensors into a third single-file flow of articles; and
   a positive displacement sorter, said sorter receives the third single-file flow of articles from the combiner and sorts the articles to separate destinations.

2. The system as claimed in claim 1 wherein articles of the first and second flows of gapped mixed articles arrive at said combiner in a controlled relative position manner wherein the articles are combined into the third single-file flow of articles by lateral displacement of some of the articles.

3. The system as claimed in claim 1 wherein each of said singulators comprise recirculating singulators each having a bulk flow input that is configured to receive a bulk flow of articles, a singulating conveying surface extending from said input to an output that is configured to arrange side-by-side articles into a single-file flow of articles and a recirculate conveying surface that is configured to return at least one of side-by side articles from said singulating conveying surface at said output to said singulating conveying surface at said input.

4. The system as claimed in claim 3 wherein said bulk flow singulators share a common said recirculate conveying surface.

5. The system as claimed in claim 3 wherein said bulk flow singulators each have a separate said recirculate conveying surface.

6. The system as claimed in claim 1 including a third article induct between said combiner and said sorter, said third article induct configured to adjust gaps between articles in said third single-file flow of articles.

7. The system as claimed in claim 1 including a fourth article induct between said first article sensor and said combiner to adjust gaps between articles exiting said first article sensor and a fifth article induct between said second article sensor and said combiner to adjust gaps between articles exiting said second article sensor.

8. The system as claimed in claim 1 including a first dynamic accumulator between the first bulk flow singulator and first induct to remove gaps in the single-file flow of mixed articles and a second dynamic accumulator between the second bulk flow singulator and second induct to remove gaps in the second flow of mixed articles.

9. The system as claimed in claim 1 including a control, said control tracking identity of articles downstream of said article sensors wherein the identity of articles supplied to said sorter is known independent of further sensing of the articles in said third single-file flow of articles.

10. The system as claimed in claim 1 wherein said sorter is capable of sorting at least 10,000 articles per hour.

11. The system as claimed in claim 1 wherein said combiner includes a conveying surface defined by upper surfaces of upper slats that are interconnected in a longitudinally travelling web and pusher shoes that each travel along at least one of said slats to laterally displace an article on said conveying surface from the second single-file flow of gapped mixed articles to the first flow of gapped mixed articles to create the third single-file flow of mixed articles.

12. The system as claimed in claim 11 wherein said combiner edge-aligns articles supplied in said third single-file flow.

13. The system as claimed in claim 1 wherein said combiner includes a first conveyor receiving articles from the first single-file flow of gapped mixed articles, a second conveyor that is generally parallel with and adjacent said first conveyor, said second conveyor receiving articles from the second single-file flow of gapped mixed articles and a control, said control monitoring the first and second single-file flows of gapped articles to establish controlled positions between articles in said first and second single-file flows of gapped mixed articles and laterally displaces an article from said second conveyor to said first conveyor into a space between articles on the first conveyor, wherein articles exit said first conveyor in a merged stream of edge-aligned mixed articles as the third single-file flow of mixed articles.

14. The system as claimed in claim 13 wherein said second conveyor is made up of a plurality of parallel slats that are interconnected in a web that travels in a longitudinal direction and a plurality of pusher shoes, each traveling laterally along at least one of said slats, wherein said control diverts pusher shoes adjacent the article being diverted toward said first conveyor from a non-diverting state in which the pusher shoes do not travel laterally to a diverting state in which the pusher shoes travel laterally.

15. The system as claimed in claim 14 wherein the first single-file flow of gapped mixed articles are edge-aligned articles when on said first conveyor and in alignment with the extent of pusher shoe travel when in the diverting state wherein diverted articles are edge-aligned with the articles of the first single-file flow of gapped mixed articles when the articles exit said first conveyor as the third single-file flow of gapped mixed articles.

16. The system as claimed in claim 13 wherein said control controls relative speeds of at least said first and second inducts in order to establish relative positions between articles on said first and second conveyors.

17. The system as claimed in claim 13 wherein diverted ones of said pusher shoes travel together in a longitudinal line to laterally displace an article without substantial rotation of that article.

18. The system as claimed in claim 13 wherein said pusher shoes have extensions that at least partially overlay said first conveyor when diverted in order to ensure that an article is displaced fully onto said first conveyor.

19. The system as claimed in claim 18 including a return rail that laterally returns said pusher shoes to a position where said extensions do not overlay said first conveyor before said pusher shoes travel to an end of said web.

20. A mixed article combiner that combines first and second single-file flow of gapped mixed articles into a third single-file flow of mixed articles, the mixed articles being of various sizes and shapes, said combiner comprising:
   a first conveyor receiving the first single-file flow of gapped mixed articles that are edge aligned on said first conveyor along an imaginary line;
   a second conveyor that is generally parallel with and adjacent said first conveyor, said second conveyor receiving the second single-file flow of gapped mixed articles and having pusher shoes that reach said imaginary line at a farthest lateral extent of said pusher shoes when in a diverted state; and
   a control, said control monitoring articles to establish relative positions between articles of the first and second single-file flows of gapped mixed articles and diverting at least one of said pusher shoes thereby diverting an article on said second conveyor to laterally displace that article to said first conveyor into a space between articles on said first conveyor, wherein articles exit said first conveyor in a merged stream of edge-aligned articles along said imaginary line as the third single-file flow.

21. The mixed article combiner as claimed in claim 20 wherein said second conveyor comprises a conveying surface defined by upper surfaces of upper slats that are interconnected in a longitudinally travelling web, said pusher shoes each travel along at least one of said slats to laterally displace an article on said conveying surface from the second single-file flow of gapped mixed articles to the first flow of gapped mixed articles to create the third single-file flow of mixed articles.

22. The mixed article combiner as claimed in claim 20 wherein diverted ones of said pusher shoes travel together in a longitudinal line to laterally displace an article without substantial rotation of that article.

23. The mixed article combiner as claimed in claim 20 wherein said pusher shoes have extensions that at least partially overlay said first conveyor when diverted in order to ensure that an article is displaced fully onto said first conveyor.

24. The mixed article combiner as claimed in claim 23 including a return rail that laterally returns said pusher shoes to a position where said extensions do not overlay said first conveyor before said pusher shoes travel to an end of said web.

25. A method of sorting the bulk flow of mixed articles to separate destinations, the mixed articles being of various sizes and shapes, said method comprising:
   receiving a bulk flow of mixed articles being of various sizes and shapes at two bulk flow singulators and arranging the bulk flow of articles to first and second single-file flows of mixed articles;
   arranging the first single-file flow of mixed articles to a first flow of gapped mixed articles separated by gaps and sensing at least the identity and weight of each article in said first flow of gapped mixed articles;
   arranging the second single-file flow of articles to a second flow of gapped mixed articles separated by gaps and sensing at least the identity and weight of each article in the second flow of gapped mixed articles;
   combining the first and second single-file flow of gapped mixed articles into a third single-file flow of articles; and
   sorting the articles from the third single-file flow of mixed articles to separate article destinations.

26. A method of combining first and second single-file flow of gapped mixed articles into a third single-file flow of articles, the mixed articles being of various sizes and shapes said method comprising:
   receiving the first single-file flow of gapped mixed articles with a first conveyor that are edge aligned on said first conyeyor along an imaginary line;
   receiving the second single-file flow of gapped mixed articles with a second conveyor that is generally parallel with and adjacent said first conveyor and having pusher shoes that reach said imaginary line at a farthest lateral extent of said pusher shoes when in a diverted state; and
   monitoring articles to establish relative spacing between articles of said first and second single-file flows of gapped mixed articles and diverting at least one of said pusher shoes thereby diverting an article on said second conveyor to laterally displace that article onto said first conveyor into a space between articles on said first conveyor, wherein articles exit said first conveyor in a merged stream of edge-aligned articles along said imaginary line as the third single-file flow.

27. A mixed article combiner that combines first and second single-file flow of gapped mixed articles into a third single-file flow of mixed articles, the mixed articles being of various sizes and shapes, said combiner comprising:
   a conveying surface defined by upper surfaces of upper slats that are interconnected in a longitudinally travelling web and pusher shoes that each travel along at least one of said slats to laterally displace an article on said conveying surface from the second single-file flow of gapped mixed articles to the first flow of gapped mixed articles to create the third single-file flow of mixed articles, wherein articles in the first flow of gapped mixed articles are edge aligned along an imaginary line, wherein said pusher shoes reach said imaginary line at a farthest lateral extent of said pusher shoes when in a diverted state;
   a control, said control monitoring articles to establish relative positions between articles of the first and second single-file flows of gapped mixed articles and diverting at least one of said pusher shoes thereby diverting an article from the second single-file flow of gapped mixed articles to displace that article into a space between articles in the first single-file flow of gapped mixed articles, wherein said combiner edge-aligns articles along said imaginary line supplied in said third single-file flow.

* * * * *

UNITED STATES PATENT AND TRADEMARK OFFICE
CERTIFICATE OF CORRECTION

PATENT NO. : 9,624,043 B2  
APPLICATION NO. : 14/792663  
DATED : April 18, 2017  
INVENTOR(S) : Koetje et al.

Page 1 of 1

It is certified that error appears in the above-identified patent and that said Letters Patent is hereby corrected as shown below:

In the Claims

Column 12  
Line 32, "conyeyor" should be --conveyor--

Signed and Sealed this  
Twenty-fifth Day of July, 2017

Joseph Matal  
*Performing the Functions and Duties of the*  
*Under Secretary of Commerce for Intellectual Property and*  
*Director of the United States Patent and Trademark Office*